US007310254B2

United States Patent
Liu et al.

(10) Patent No.: US 7,310,254 B2
(45) Date of Patent: Dec. 18, 2007

(54) AC-TO-AC (FREQUENCY) CONVERTER WITH THREE SWITCHES PER LEG

(75) Inventors: Congwei Liu, Toronto (CA); Bin Wu, Toronto (CA); Navid R. Zagari, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 113 days.

(21) Appl. No.: 11/354,423

(22) Filed: Feb. 15, 2006

(65) Prior Publication Data
US 2007/0189044 A1   Aug. 16, 2007

(51) Int. Cl.
*H02M 5/275* (2006.01)
(52) U.S. Cl. ....................................... 363/163
(58) Field of Classification Search ................. 363/157, 363/163, 164, 165
See application file for complete search history.

(56) References Cited

U.S. PATENT DOCUMENTS 6,031,738 A * 2/2000 Lipo et al. .................... 363/37

6,987,372 B1   1/2006 Wu et al.

OTHER PUBLICATIONS

Sakutaro Nonaka and Yasuhiko Neba, Current Regulated PWM-CSI Induction Motor Drive System Without a Speed Sensor, IEEE Transactions on Industry Applications, vol. 30, No. 1, Jan./Feb. 1994.
Thomas G. Habetler, A Space Vector-Based Rectifier Regulator for AC/DC/AC Converters, IEEE Transactions on Power Electronics, vol. 8, No. 1, Jan. 1993.
J.W. Kolar, M.Baumann, F. Schafmeister, H. Ertl, Novel Three-Phase AC-DC-AC Sparse Matrix Converter, Part I: Derivation, Basic Principle of Operation, Space Vector Modulation, Dimensioning, APEC 2002, V2 pp. 777-791, 2002.

* cited by examiner

*Primary Examiner*—Shawn Riley
(74) *Attorney, Agent, or Firm*—Steven M. Haas; Alexander R. Kuszewski

(57) ABSTRACT

AC-to-AC power conversion systems and methods are presented, in which a small number of asymmetrical power switching devices are used to convert input AC power to output AC power of constant or variable frequency.

22 Claims, 14 Drawing Sheets

| STATE | $S_{A1}$ | $S_{A2}$ | $S_{A3}$ | $V_{AN}$ | $V_{RN}$ |
|---|---|---|---|---|---|
| 1) VAN = Vd, VRN = Vd | ON | ON | OFF | Vd | Vd |
| 2) VAN = 0 , VRN = 0 | OFF | ON | ON | 0 | 0 |
| 3) VAN = Vd, VRN = 0 | ON | OFF | ON | Vd | 0 | under the headline US 7,310,254 B2

AC-TO-AC (FREQUENCY) CONVERTER WITH THREE SWITCHES PER LEG

FIELD OF THE INVENTION

The present invention relates generally to electrical power conversion, and more particularly to AC-to-AC conversion systems.

BACKGROUND OF THE INVENTION

Conversion of electrical power from an input AC form to an output AC form is used extensively in industrial applications. In particular, three-phase bi-directional AC/DC/AC converters have been employed in motor drive applications, power generation systems, line conditioners and uninterruptible power supply systems (UPS). This type of converter provides sinusoidal current and adjustable power factor in both the input (line) side and the output (load) side. Conventional three-phase bi-directional AC/DC/AC converters include two three-phase PWM inverters coupled to a dc-link that provides some form of reactance, such as a capacitor or inductor for back-to-back voltage or current source configurations, respectively. This type of conversion system is sometimes referred to as a two-stage converter since the conversion occurs in two stages, the first involving conversion from three-phase AC to DC, and the second providing conversion from DC to three-phase output AC, where the output AC can have variable voltage and/or frequency. However, because there are two energy conversions, the energy efficiency of conventional two-stage converters is lower than single-stage conversions. Direct AC-to-AC converters have been proposed to address this efficiency, including AC/AC matrix converters, in which the energy in three-phase input AC voltage is directly transferred to the three-phase output voltage. However, three-phase AC/AC matrix converters require 18 power switching devices as well as complicated commutation switching controls with snubber circuits to avoid input side short circuit and output side open-circuit conditions. So-called sparse matrix converters have also been introduced in an attempt to decrease the number of switching devices. These converters essentially modify the standard matrix converter by the use of two-stage energy conversion from AC to DC and then from DC to AC. The sparse matrix converters do not require DC link reactance components, and switch loss of input side switches can be reduced by special PWM switching control. However, the sparse matrix converter designs require three additional switching devices and six extra diodes compared with 12 power switching devices used in standard two-stage AC/DC/AC converters. Thus, there is a continuing need for improved conversion system designs by which one form of AC electrical power can be efficiently converted to a second AC form without requiring a large number of switching devices or complicated switching controls.

SUMMARY OF INVENTION

One or more aspects of the invention are now summarized to facilitate a basic understanding of the invention, wherein this summary is not an extensive overview of the invention, and is intended neither to identify certain elements of the invention, nor to delineate the scope thereof. The primary purpose of the summary, rather, is to present some concepts of the invention in a simplified form prior to the more detailed description that is presented hereinafter. The present invention involves AC-to-AC energy conversion between two single or three-phase systems using an intermediate dc circuit, and finds utility in any number of power conversion applications, including but not limited to UPS, line conditioner, voltage restorer, motor drive, and special power supply applications in which the output can provide variable voltage and/or variable frequency AC electrical power.

In accordance with one or more aspects of the invention, a nine device three-phase AC-to-AC conversion system is provided, having nine switches in a network forming three leg circuits with three switches in each leg circuit to convert AC input power at three input terminals to AC output power at three output terminals. The leg circuits are individually connected to a corresponding input terminal and an output terminal, with a first switch coupled between the input terminal and a first DC terminal, a second switch between the input terminal and the output terminal, and a third switch between the output terminal and a second DC terminal. A control system provides signals to the switches to convert input AC electrical power from the input connection to output AC electrical power at the output connection. In one embodiment, each leg circuit is provided with a set of signals to selectively place the leg circuit in one of three states including a first state to couple the corresponding input and output terminals to the first DC terminal, a second state to couple the input and output terminals to the second DC terminal, and a third state to couple the input terminal to the first DC terminal and to couple the output terminal to the second DC terminal, where the switching control signals may be provided such that the output terminal connected to each leg circuit is maintained at the same or a lower voltage than the input terminal connected associated with the leg circuit. In certain embodiments, the control signals are pulse width modulated by the control system using sinusoidal pulse width modulation, and the control system provides the switching control signals so as to convert input AC electrical power from the input to variable frequency output AC electrical power. The switches, moreover, may be asymmetrical devices that can block voltage in only one direction and allow current flow in two directions.

One or more further aspects of the invention relate to a nine device, three-phase AC-to-AC conversion system, comprising a switching network including a total of nine switching devices able to block voltage in only one direction and allow current flow in two directions. The converter has a control system coupled with the switching network and controlling the switching devices to convert input AC electrical power from a three-terminal input connection to output AC electrical power at a three terminal output connection. In one possible implementation, the switching network comprises three leg circuits of three switches per leg, with each of the leg circuits being connected to a corresponding pair of input and output terminals. The control system in one example provides switching signals to the leg circuits in one of three states to selectively couple the corresponding input and output terminals to the first DC terminal in a first state, to couple the input and output terminals to the second DC terminal in a second state, and to couple the input terminal to the first DC terminal and to couple the output terminal to the second DC terminal in a third state.

Other aspects of the invention provide six device, single phase AC-to-AC converters with a single-phase AC input having first and second input terminals, a single-phase AC output having first and second output terminals, and a DC circuit comprising first and second DC terminals and an energy storage component. One implementation includes a total of six switching devices forming two leg circuits with a total of three switching devices in each leg circuit, where each leg is connected to a corresponding AC input terminal and a corresponding AC output terminal. In this embodiment, a first switching device of each leg is coupled between the corresponding input terminal and the first DC terminal, a second switch is coupled between the input terminal and the output terminal, and a third switch is coupled between the output terminal and the second DC terminal, where a control system provides switching control signals to convert the single-phase AC input power to output AC power at the output connection. In another possible implementation, the switching network includes a total of six asymmetrical switching devices that are able to block voltage in only one direction and allow current flow in two directions, and a control system is coupled with the switching network to convert input AC electrical power from the input connection to output AC electrical power at the output connection.

BRIEF DESCRIPTION OF THE DRAWINGS

The following description and drawings set forth certain illustrative implementations of the invention in detail, which are indicative of several exemplary ways in which the principles of the invention may be carried out. The illustrated examples, however, are not exhaustive of the many possible embodiments of the invention. Other objects, advantages and novel features of the invention will be set forth in the following detailed description of the invention when considered in conjunction with the drawings, in which.

DETAILED DESCRIPTION OF THE INVENTION

Figure 1A:
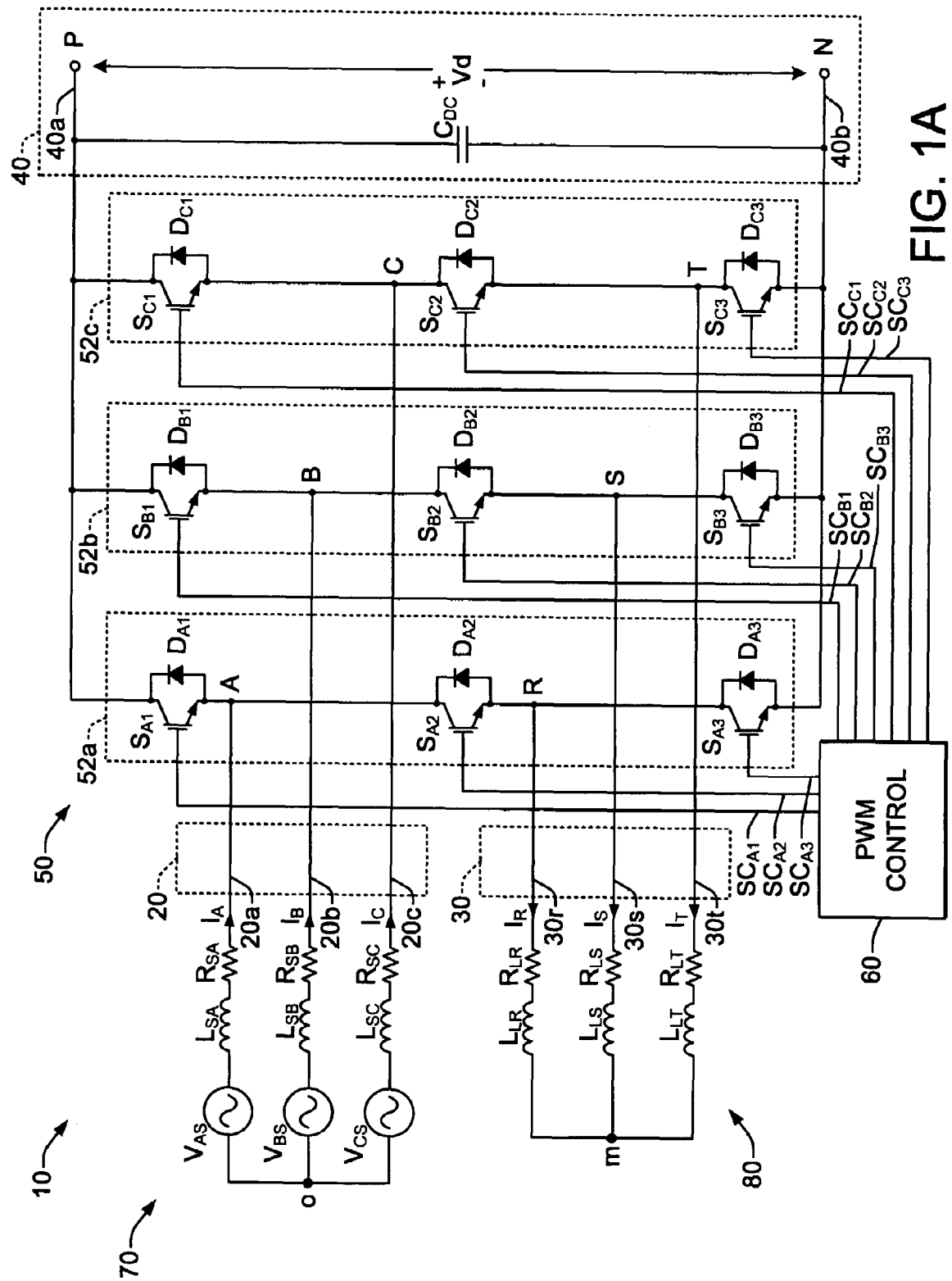
FIG. 1A is a schematic diagram illustrating an exemplary nine-device three-phase AC-to-AC conversion system in accordance with one or more aspects of the present invention.

Referring now to the figures, several embodiments or implementations of the present invention are hereinafter described in conjunction with the drawings, wherein like reference numerals are used to refer to like elements throughout, FIG. 1A shows an exemplary nine-device AC-to-AC power conversion system or power converter 10 in accordance with one or more aspects of the invention. The system 10 includes a three-phase AC input connection or circuit 20 with AC input terminals 20a, 20b, and 20c (terminals A, B, and C) for receiving three-phase AC electrical input power from a three-phase input source 70, along with a three-phase AC output connection or circuit 30 with output terminals 30a, 30b, and 30c (R, S, and T) for providing three-phase AC electrical output power to a three-phase load 80, and a DC circuit 40 comprising terminals 40a and 40b (P and N) and an energy storage component, such as a DC capacitor $C_{DC}$. In the illustrated example, the input source 70 is shown schematically as three AC voltage sources $V_{AS}$, $V_{BS}$, and $V_{CS}$ coupled to the input terminals A, B, and C through series inductive and resistive impedance elements $L_{SA}$, $R_{SA}$, $L_{SB}$, $R_{SB}$, and $L_{SC}$, $R_{SC}$, respectively, with the sources $V_{AS}$, $V_{BS}$, and $V_{CS}$ connected in a "Y" configuration to a common neutral point or node "0", although any type of three-phase AC input source 70 may be connected to the input 20. The terminals R, S, and T of the output connection 30 may be connected to any type of three-phase load 80, illustrated in the example of FIG. 1A as three loads connected in a Y configuration to a common neutral "m", with the exemplary loads being illustrated as a series load inductance $L_{LR}$ and resistance $R_{LR}$ coupled to output phase R, a series load inductance $L_{LS}$ and resistance $R_{LS}$ coupled to output phase S, and a series load inductance $L_{LT}$ and resistance $R_{LT}$ coupled to output phase T, although the converters of the invention can be used to provide AC output power to any type of load, such as a three-phase AC electric motor, etc.

System 10 also includes a nine device switching network 50 including a total of nine switching devices S forming three leg circuits 52a, 52b, and 52c. Each leg circuit includes a total of three switches S, where circuit 52a has first, second, and third switches $S_{A1}$, $S_{A2}$, and $S_{A3}$, respectively, circuit 52b has first, second, and third switches $S_{B1}$, $S_{B2}$, and $S_{B3}$, respectively, and circuit 52c has first, second, and third switches $S_{C1}$, $S_{C2}$, and $S_{C3}$, respectively. Each leg circuit 52 is connected to the positive and negative terminals 40a and 40b of the DC circuit 40, and also to a corresponding AC input terminal and a corresponding AC output terminal, where the first leg circuit 52a is connected to input terminal A 20a and output terminal R 30r, second leg circuit 52b is connected to input terminal B 20b and output terminal S 30s, and third leg circuit 52c is connected to input terminal C 20c and output terminal T 30t. As illustrated in FIG. 1A, moreover, each leg circuit comprises a first switching device ($S_{A1}$, $S_{B1}$, $S_{C1}$) coupled between the corresponding input terminal (A, B, C) and the first DC terminal P 40a, with a second switch ($S_{A2}$, $S_{B2}$, $S_{C2}$) coupled between the input terminal and the corresponding output terminal (R, S, T), and a third switch ($S_{A3}$, $S_{B3}$, $S_{C3}$) coupled between the corresponding output terminal and the second DC terminal 40b (N). Any form of switching devices S may used to provide selective electrical connection in a first state and electrical isolation in a second state, for example, GTOs, IGBTs, IGCTs, etc. (IGBTs in the illustrated embodiments), wherein the individual switching devices S in the illustrated embodiments include freewheeling diodes $D_{A1}$-$D_{A3}$, $D_{B1}$-$D_{B3}$, and $D_{C1}$-$D_{C3}$, whereby the switching devices are unidirectional or asymmetric with respect to voltage blocking, being operable to block voltage in only one direction and to allow current flow in two directions, although not a strict requirement of the invention.

The nine device converter 10 also includes a control system 60 coupled with the switching network 50 and providing switching control signals SC to the switching devices S to convert input AC electrical power from the input connection 20 to output AC electrical power at the output connection 30. Any manner of control system 60 may be used, such as logic, processor-based circuits, software, firmware, combinations of hardware and software, etc., to selectively operate the switches S for controlled AC-to-AC conversion, wherein the exemplary system 60 is a pulse width modulation (PWM) type providing three sets of switching control signals SC to the switching network 50. In the illustrated example, a first control signal set $SC_{A1}$, $SC_{A2}$, and $SC_{A3}$ is provided to the switches $S_{A1}$, $S_{A2}$, and $S_{A3}$ of the first leg circuit 52a, respectively, a second set $SC_{B1}$, $SC_{B2}$, and $SC_{B3}$ is provided to the switches $S_{B1}$, $S_{B2}$, and $S_{B3}$ of the second leg circuit 52b, respectively, and a third switching control signal set $SC_{C1}$, $SC_{C2}$, and $SC_{C3}$ is provided to the switches $S_{C1}$, $S_{C2}$, and $S_{C3}$ of the third leg circuit 52c. As further described below with respect to FIGS. 2A and 2B, the signal sets are provided in one of three states in a leg for conversion of input AC power to output power at the output terminals R, S, and T in the exemplary three-phase converter 10. Moreover, although discussed in the context of single-direction power conversion, the converters of the invention may be operated to convert power in either direction, wherein the output connection 30 can alternatively be used to receive input electrical power and the input connection 20 can be used to provide output AC power. The input connections 20, 120 can be connected to output loads 80, 180, and the output connections 30, 130 can be connected to input sources 70, 170 respectively in FIGS. 1A and 1B.

Figure 1B:
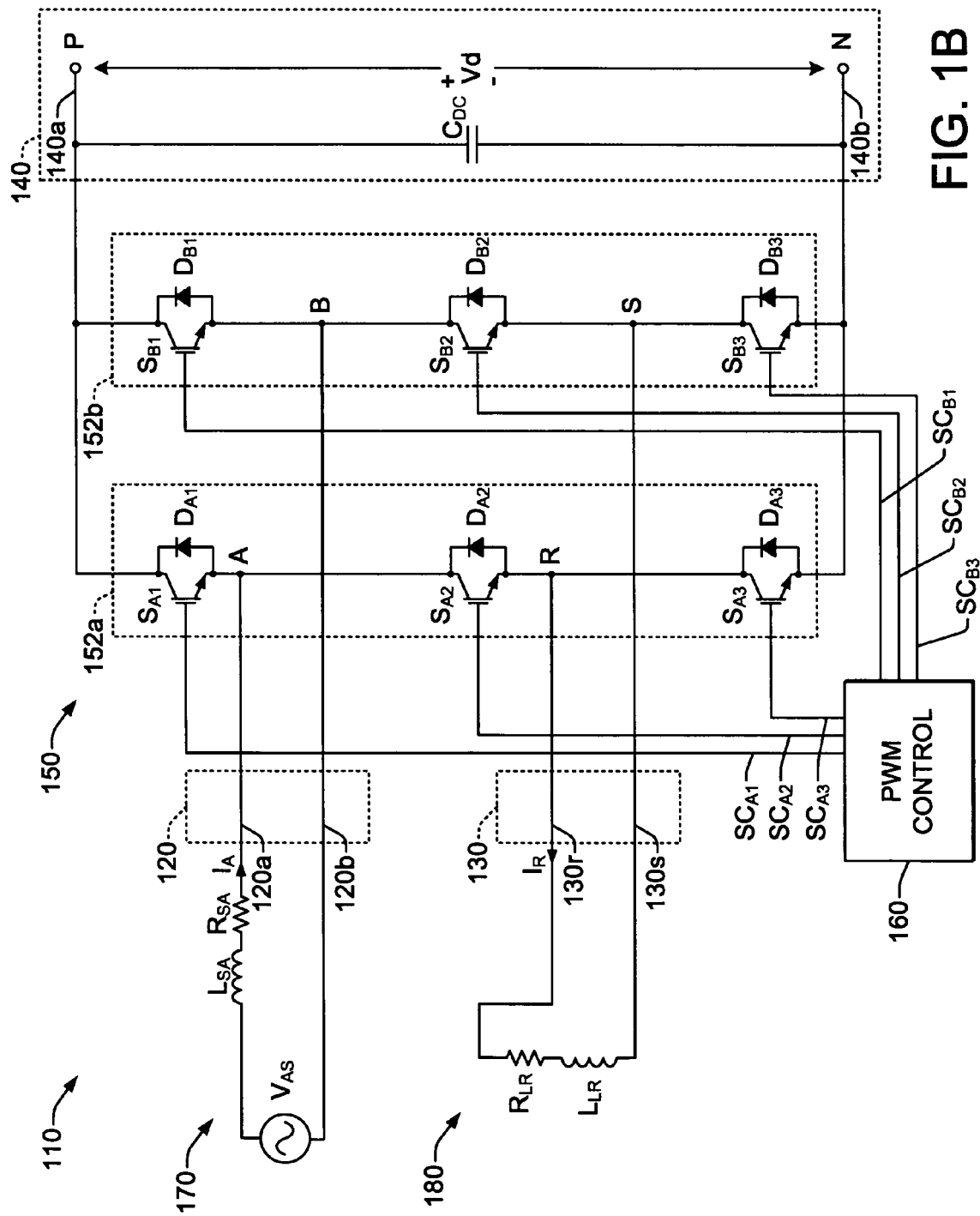
FIG. 1B is a schematic diagram illustrating an exemplary single-phase AC-to-AC converter having six asymmetrical switching devices configured in a dual-leg switching network in accordance with further aspects of the invention.

Referring also to FIG. 1B, another exemplary AC-to-AC conversion system 110 is illustrated, in this case a six device, single-phase embodiment receiving single-phase AC input power from a source 170 and providing output power to a single-phase load 180 according to various aspects of the present invention. The single-phase converter 110 includes a single-phase AC input connection 120 having first and second AC input terminals 120a and 120b (A and B) for receiving single-phase AC electrical input power from the source 170, where the exemplary source 170 is shown as an AC voltage source $V_{AS}$ in series with a source inductance $L_{S_A}$ and a series resistance $R_{S_A}$. The conversion system 110 further comprises a single-phase AC output connection 130 having output terminals 130r and 130s (R and S) for providing single-phase AC electrical output power to a load, shown in this example as a series combination of an inductance $L_{LR}$ and a resistance $R_{LR}$. In addition, a DC circuit 140 is provided, including first and second DC terminals 140a (P) and 140b (N) and an energy storage component (capacitor $C_{DC}$), as well as a six device switching network 150 with a pair of three-device leg circuits 152a and 152b. As in the three-phase converter 10 above, the six switching devices S in the single-phase converter 110 are flyback diode connected IGBTs that can block voltage in only one direction and allow current flow in two directions, with three devices S in each leg circuit 152. Each leg circuit 152, moreover, is connected to a corresponding AC input terminal (A or B) and to a corresponding AC output terminal (R or S), and includes a first switching device ($S_{A1}$ or $S_{B1}$) coupled between the corresponding input terminal (A, B) and the first DC terminal 140a (P), a second switch ($S_{A2}$ or $S_{B2}$) coupled between the corresponding input (A, B) and output (R, S) terminals, and a third switch ($S_{A3}$ or $S_{B3}$) coupled between the output terminal (R, S) and the second DC terminal 140b (N). A PWM switching control system 160 is coupled with the dual-leg switching network 150 and provides switching control signals SC to the switching devices S thereof to convert input power from the connection 120 to output AC electrical power at the output connection 130.

Figures 2A, 2B:
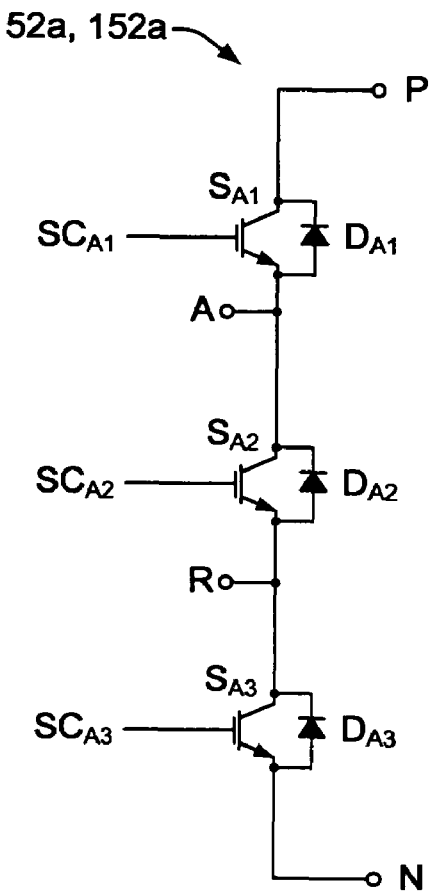
FIG. 2A is a partial schematic diagram showing a single leg circuit from the converters of FIGS. 1A and 1B, with a first switch coupled between a corresponding AC input terminal and a first DC terminal, a second switch coupled between the input terminal and the corresponding AC output terminal, and a third switch coupled between the output terminal and a second DC terminal.
FIG. 2B is a table showing an exemplary three-state switching operation of the converter leg circuits of FIGS. 1A, 1B, and 2A, defining a first state to couple the input and output terminals to the first DC terminal, a second state to couple the input and output terminals to the second DC terminal, and a third state to couple the input terminal to the first DC terminal and to couple the output terminal to the second DC terminal.

Referring also to FIGS. 2A and 2B, the leg circuits 52, 152 of the three-phase and single-phase converters 10, 110, as well as the sets of switching control signals SC provided thereto, may be implemented in similar fashion to achieve three-state switching operation of each switch leg circuit 52, 152 in the exemplary systems 10, 110 for converting input AC power to output AC at a constant frequency (CF operation with the input and output frequencies being the same, and variable amplitude of fundamental input and output voltages) or at a variable output frequency (VF operation where the output frequency can be adjusted relative to the input frequency, and the amplitude of fundamental input and output voltages can be varied). FIG. 2A illustrates an exemplary leg circuit 52a, 152a, including switches $S_{A1}$-$S_{A3}$ connected as in FIGS. 1A and 1B, coupled with the corresponding first input and output terminals A and R, respectively, as well as with the DC terminals P and N, wherein the other leg circuits 52, 152 are similarly constructed. The corresponding set of signals SC from the control system 60, 160 includes signals $SC_{A1}$, $SC_{A2}$, and $SC_{A3}$ coupled to the first, second, and third switching devices $S_{A1}$, $S_{A2}$, and $S_{A3}$, respectively, of the leg circuit 52a, 152a, wherein the other leg circuits 52, 152 of the exemplary converters 10, 110 are similarly connected and switched for three-state operation as described hereinafter with respect to the first leg circuit 52a, 152a and corresponding switching control signal set. FIG. 2B shows a table 200 illustrating an exemplary three-state switching operation of the exemplary leg circuit 52a, 152a implemented by the control system 60, 160 in the converters 10, 110 of FIGS. 1A, 1B, and 2A. The table 200 defines a first state with switches $S_{A1}$ and $S_{A2}$ turned on and switch $S_{A3}$ turned off to couple the input and output terminals A and R to the first (positive) DC terminal P, as well as a second state with $S_{A1}$ turned off and with $S_{A2}$ and $S_{A3}$ turned on to couple the input and output terminals to the second DC terminal, and a third state with $S_{A1}$ and $S_{A3}$ turned on and with $S_{A2}$ turned off to couple the input terminal A to DC terminal P and to couple the output terminal R to the DC terminal N.

The operation of the leg circuits 52 and the control system 60 are described hereinafter with respect to the three-phase converter 10 of FIG. 1A for sake of illustrating the various concepts of the invention, wherein similar operation is provided in the single-phase implementation 110 of FIG. 1B. In operation of the converter 10 of FIG. 1A, the three phase input current $I_A$, $I_B$ and $I_C$ and output currents $I_R$, $I_S$, and $I_T$ are controlled by controlling the voltages of the input terminals A, B and C and the output terminals R, S and T, respectively, by selective provision of the switching control signals SC from the control system 60 in one of the three states in a leg shown in FIG. 2B. In this manner, a portion of input energy is transferred to the DC circuit 40 for later transfer to the output 80, with the remaining energy being directly converted from the input 70 to the output 80, using fewer switches than required in conventional back-to-back conversion systems. In the illustrated implementations, the control system 60 provides pulse width modulated (PWM) signals $SC_{A1}$, $SC_{A2}$, and $SC_{A3}$ (and the signals to the other leg circuits 52b and 52c) so as to maintain the voltage at the output terminal associated with each leg circuit 52 at or below the voltage at the corresponding input terminal using the exemplary three-state switching scheme in the table 200 of FIG. 2B, wherein the switching control signals SC can be provided using any switching techniques, including but not limited to sinusoidal pulse width modulation or space vector modulation (SVM) as in the illustrated examples, or by other switching method. As described further below, the illustrated switching schemes allow separate control of the input and output phase voltages while maintaining the output voltage of a given leg circuit at or below the input level, using control over the leg circuit switching states by adding different offsets or common mode voltages to the modulating waveforms for the input and output. Moreover, as shown below, the converters 10, 110 may be operated in constant frequency (CF) mode or in variable frequency (VF) mode in which the control systems 60, 160 provide the switching control signals SC to convert input AC electrical power to variable frequency output AC electrical power at the output connections 30, 130.

Figure 3:
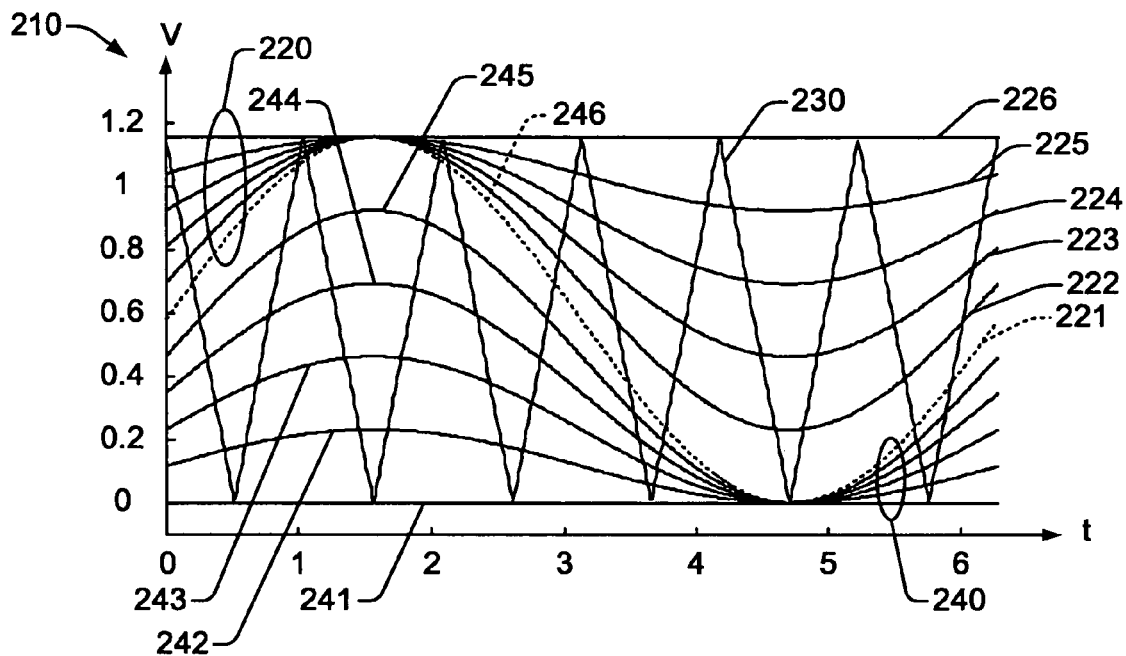
FIG. 3 provides a graph illustrating exemplary input and output modulation waveforms and a common carrier waveform for sinusoidal PWM constant frequency (CF) operation of the converters of FIGS. 1A and 1B for different modulation index (MI) values.
Figure 4:
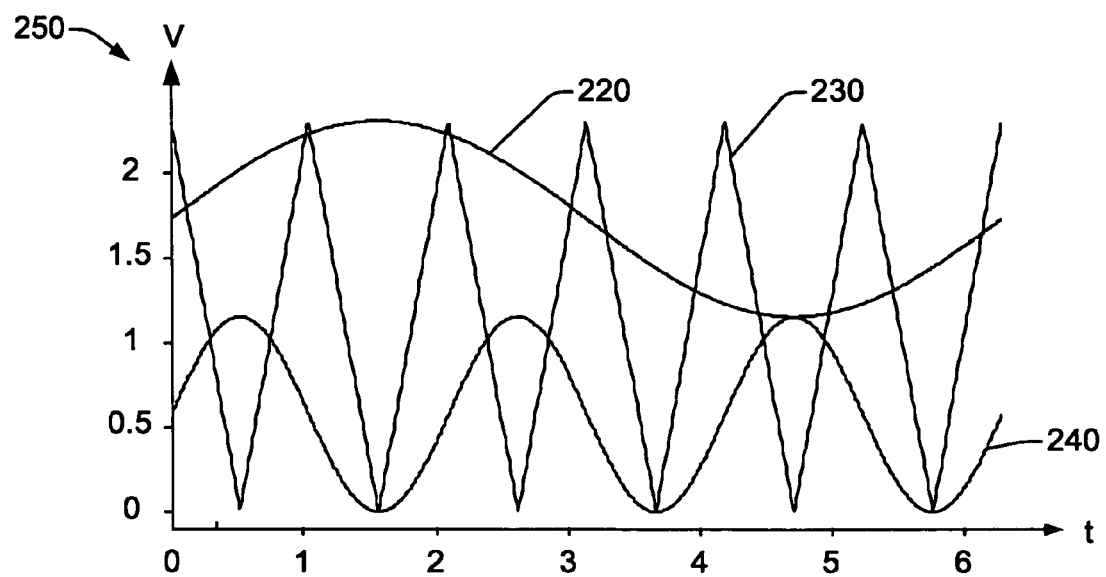
FIG. 4 depicts a graph illustrating exemplary input and out modulation waveforms and a common carrier waveform for sinusoidal PWM variable frequency (VF) operation of the converters of FIGS. 1A and 1B for a single exemplary modulation index value.

Referring now to FIGS. 3 and 4, graphs 210 and 250 are shown, illustrating one preferred pulse width modulation scheme that may be implemented in the control system 60 to control switching of the nine switching devices S in the converter 10. In general, modulation waveforms are created for both input and output, with a common carrier waveform used in pulse width modulation for generating the switching control signals SC, where the amplitude and frequency of the modulation waveform determines or controls the amplitude and frequency of the input or output being modulated. The graph 210 in FIG. 3 illustrates exemplary input and out modulation waveforms 220 and 240, respectively, and a common triangular carrier waveform 230 for sinusoidal PWM constant frequency (CF) operation of the converters 10, 110 of FIGS. 1A and 1B for different modulation index (MI) values. In the graph 210, input modulation curves 226, 225, 224, 223, 222, and 221 are shown along with output modulation curves 241, 242, 243, 244, 245, and 246 corresponding to modulation index values of 0, 0.173, 0.346, 0.519, 0.693, and 0.866, respectively.

In the illustrated switching network configuration, moreover, it is desirable to prevent the output terminal voltage from exceeding the input terminal voltage in any of the leg circuits 52. In this regard, the exemplary PWM switching control scheme introduces offsets or DC common mode voltages to the modulation waveforms to ensure that the input modulation waveforms 220 for input phases A, B, and C (e.g., Vma, Vmb, Vmc) over the range of input phase voltages ($V_{AN}$, $V_{BN}$, $V_{CN}$) are always larger than (or at least equal to) the corresponding output modulation waveforms 240 for output phases R, S, and T (e.g., Vmr, Vms, and Vmt) for all possible values of the output phase voltages ($V_{RN}$, $V_{SN}$, $V_{TN}$), which ensures the input voltage is always larger than the output voltage in each leg circuit. The exemplary input and output modulations, moreover, are in phase with respect to one another (aligned in time), and employ a common carrier waveform, such as the exemplary triangular carrier signal 230 Vcr of FIGS. 3 and 4. A graph 250 in FIG. 4 shows the exemplary input and output modulation waveforms 220 and 240 for a modulation index value of 0.433, together with the carrier waveform 230 for sinusoidal PWM variable frequency (VF) operation of the converters 10, 110 of FIGS. 1A and 1B, in which the output AC power is provided at a different (higher) frequency than the input AC power.

In this sinusoidal PWM implementation, each of the modulation waveforms 220, 240 is compared with the carrier waveform 230, with the input and output waveforms of the converters 10, 110 being determined accordingly, wherein any suitable pulse width modulation techniques can be used in accordance with the invention. For instance, waveform generation circuits can be used to generate modulation and carrier waveforms 220, 230, 240 as illustrated in FIGS. 3 and 4, together with various offset voltage circuits and two comparator circuits for comparing the individual modulation signals 220 and 240 with the carrier 230 for generating signals applied to logic, such as logic circuits 300 depicted in FIG. 6. Alternatively, the pulse width modulation may be carried out in processor-based implementations, with the illustrated modulation waveforms, offsets, and comparisons being performed in software, firmware, or other digital logic. In either CF or VF AC-to-AC operation of the conversion system 10, the control system 60 provides a positive dc shift to the input modulation waveform 220, while a negative dc shift is added to output modulation waveform 240, where the amount of these shifts or offsets can be of any form that prevents the system output voltage from exceeding the input voltage within any of the leg circuits 52. In the illustrated system 10, different offsets are used for different PWM schemes, and the offsets may also vary with modulation index of input and output voltage, and according to whether the converter 10 is operated in constant or variable frequency mode.

In the illustrated constant frequency implementations (e.g., FIG. 3), the input and output modulation waveforms 220 and 240 are shifted according to the phase difference therebetween in order to prevent the output modulation waveform 240 from exceeding the input modulation waveform 220. In this case, as exemplified in the curves of FIGS. 3 and 4, the input modulation waveforms 220 (e.g., waveforms Wma, Wmb, and Wmc for the three input phases) are given by the following equation 1:

$$Vm_{INPUT} = Vd - Vip + Vip \sin \theta, \qquad 1)$$

where Vd is the DC circuit voltage across capacitor $C_{DC}$ (FIG. 1A) and Vip is the peak value of the input modulation waveform, and wherein the individual modulation waveforms for the three phases A, B, and C are shifted 120 degrees relative to one another (e.g. 180 degree shift for single-phase converter 110). In addition, the output modulation waveforms 240 (e.g., waveforms Wmr, Wms, and Wmt for the three output phases R, S, and T) are given by the following equation 2:

$$Vm_{OUTPUT} = Vop + Vop \sin \theta, \qquad 2)$$

where Vop is the peak value of the output modulation waveform, and wherein the individual modulation waveforms for the three output phases R, S, and T are shifted 120 degrees relative to one another (e.g. 180 degree shift for single-phase converter 110). In this regard, the inventors have appreciated that the minimum value of the DC circuit voltage Vd will vary with the amount of phase difference between the input and output voltages in constant frequency operating mode, wherein it may be preferable in certain implementations to restrict the input-to-output phase difference.

In an exemplary variable frequency (VF) implementation (e.g., FIG. 4) of the three-phase converter 10, the dc shift in the input modulation waveforms 220 (e.g., waveforms Wma, Wmb, and Wmc) are given by the following equation 3:

$$(3Vd/4) + Vip \sin \theta_1, \qquad 3)$$

and the output modulation waveforms 240 (e.g., waveforms Wmr, Wms, and Wmt) are given by the following equation 4:

$$(Vd/4) + Vop \sin \theta_2, \qquad 4)$$

where $\theta_1$ and $\theta_2$ are changed in different frequencies. Thus, as shown in FIGS. 3 and 4, the maximum input modulation waveform 221 and the maximum output modulation waveform 246 are generally equal, but the input modulation waveforms 220 are always greater than or equal to the output waveforms 240 in the exemplary PWM scheme using the above offsets. However, other offset schemes and PWM techniques may be employed by which the voltage at the input terminal associated with each leg circuit 52 is never exceeded by the corresponding output terminal voltage.

Figure 5A:
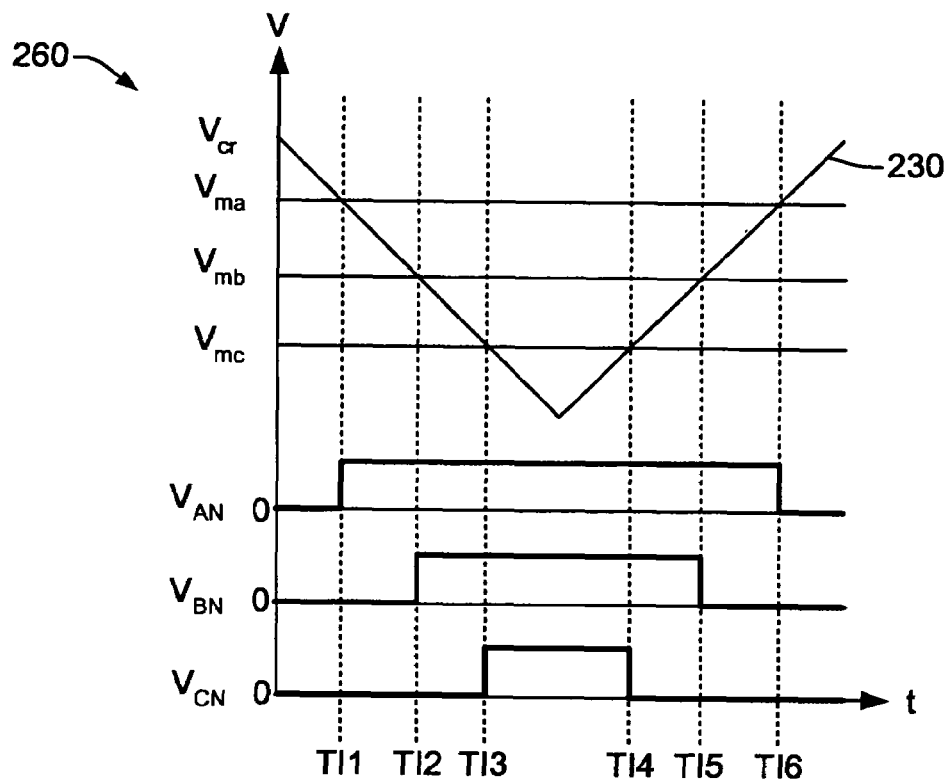
FIGS. 5A and 5B are graphs showing input and output switching sequence waveforms for an exemplary sinusoidal PWM implementation of the converters of FIGS. 1A and 1B over a single switching cycle.
Figure 5B:
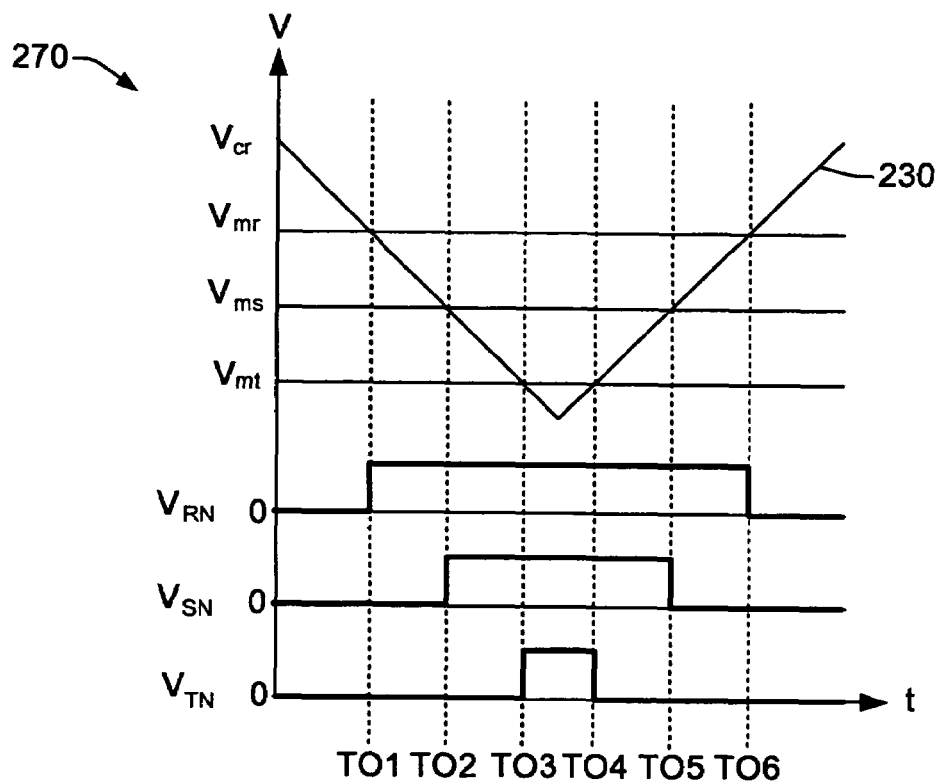

Referring also to FIGS. 5A and 5B, in the illustrated implementation of the control system 60, the exemplary sinusoidal pulse width modulated switching sequence in the controller 60 is partitioned into seven switching or commutation segments per PWM period (seven-segment sequence in every switching pattern cycle). FIG. 5A illustrates an exemplary graph 260 and FIG. 5B shows a graph 270 over a typical switching cycle for an exemplary case where the frequency of the carrier 230 is much higher than the modulation waveforms 220, 240, wherein the graphs 260 and 270 are abstracted in the sense that input modulation waveform values Vma, Vmb, and Vmc and the output waveforms Vmr, Vms, and Vmt are shown as being constant for the sake of illustration. With respect to the desired input and output waveforms $V_{AN}$, $V_{BN}$, $V_{CN}$, and $V_{RN}$, $V_{SN}$, $V_{TN}$, these are shown in the graphs 260 and 270, respectively, with each being high when the corresponding modulation waveform is greater than the carrier 230, such that the width of the desired input and output waveforms is determined by the modulating and carrier waveforms, with the three phases of input and output modulating waveforms 220 and 240 being phase shifted accordingly. Thus, these can be generated, for example, using comparator circuits (not shown) or in software by comparing the individual input and output modulation waveforms 220, 240 with the carrier 230. In the illustrated example of FIG. 5A, the desired first phase input $V_{AN}$ is high from time TI1 to TI6, $V_{BN}$ is high from time TI2 to TI5, and $V_{CN}$ is high from time TI3 to TI4. Similarly in the output graph 270 of FIG. 5B, desired output $V_{RN}$ is high from time TO1 to TO6, $V_{SN}$ is high from time TO2 to TO5, and $V_{TN}$ is high from time TO3 to TO4.

Figure 6:
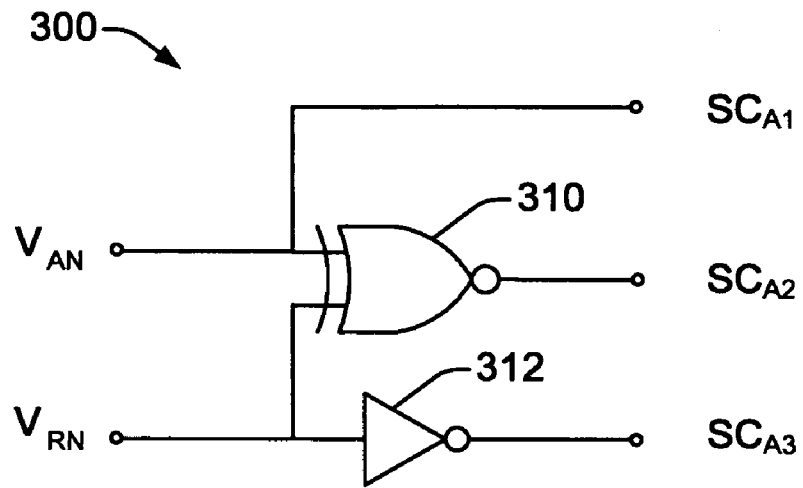
FIG. 6 is a partial schematic diagram illustrating a logic circuit of the converter switching control system for driving one of the converter leg circuits in an exemplary sinusoidal PWM implementation of the converters of FIGS. 1A and 1B.
Figure 7:
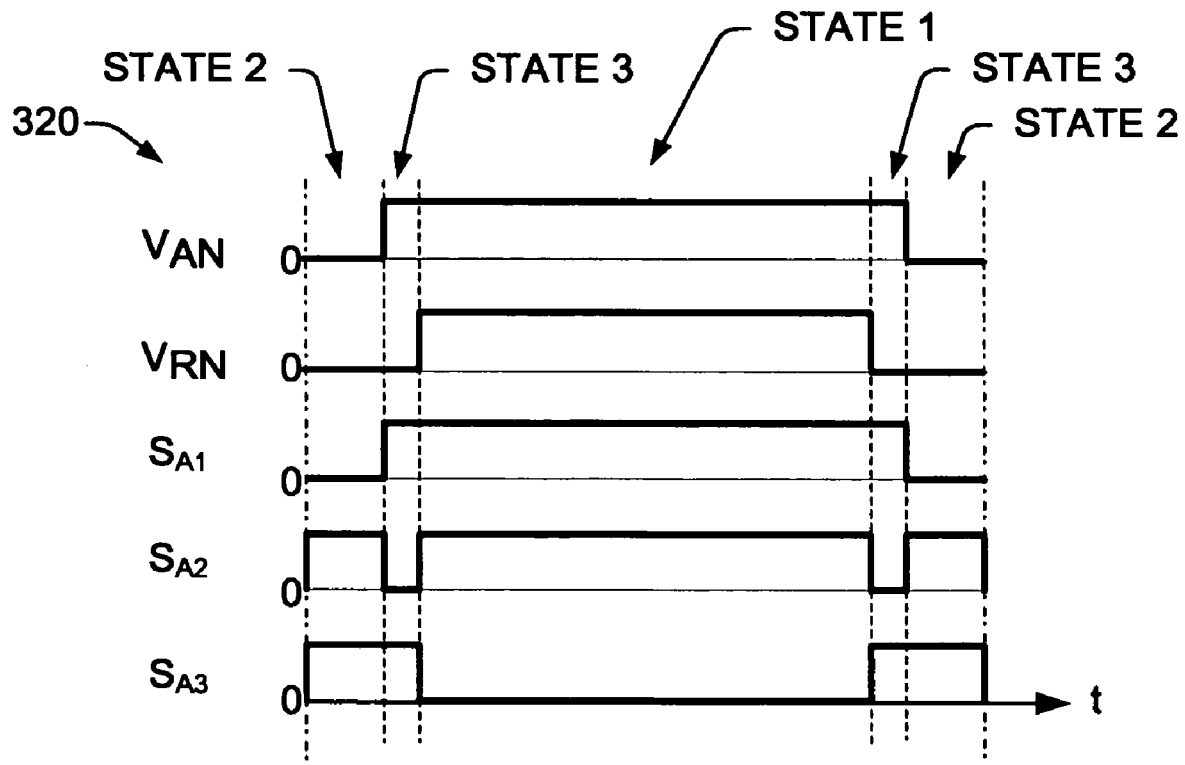
FIG. 7 is a graph illustrating the input and output signals of the logic circuit of FIG. 6 in the converters of FIGS. 1A and 1B.

Referring also to FIGS. 6 and 7, for each leg circuit, a logic circuit 300 (FIG. 6) can be provided, which employs the corresponding leg input and output desired signal waveforms as circuit inputs (e.g., desired leg input $V_{AN}$ and leg output $V_{RN}$ for the first leg circuit 52a), and generates switch control signals SC for the corresponding leg circuit 52 (e.g., $SC_{A1}$, $SC_{A2}$, and $SC_{A3}$ for the exemplary first leg circuit 52a), wherein individual circuits 300 are provided for driving each leg circuit 52. Alternatively, the logic of circuits 300 and the functionality described herein for driving the leg circuits 52 can be implemented in firmware, software, etc. The resulting first set of exemplary switching control signals $SC_{A1}$, $SC_{A2}$, and $SC_{A3}$ is illustrated in graph 320 of FIG. 7, wherein the switching logic of the control system 60 provides for different switching states 2, 3, 1, 3, and 2, respectively.

The example of FIGS. 5A-7 shows a sinusoidal pulse width modulation switching approach for the three-phase converter 10 of FIG. 1A, which may also be used in the single-phase implementation 110 of FIG. 1B and other converters in accordance with the invention. Other PWM approaches may be implemented in which one or more modifications are made to the modulating waveforms, for instance, wherein a third harmonic component is added to the primary or fundamental sinusoid, with the composite waveform being modulated with a carrier (e.g., triangular or otherwise), wherein all such variants are contemplated as being equivalent forms of sinusoidal pulse width modulation within the scope of the invention, whether or not the modulating waveform is purely sinusoidal. Moreover, other pulse width modulation techniques can be employed, for example, such as space vector modulation (SVM) wherein a sequence of switching states or patterns are defined according to a space vector diagram through which a reference vector rotates, with the specific pattern or state sequence being employed and the corresponding dwell times being determined according to the present reference vector position, with appropriate selection of switching states and dwell time computations to ensure that the input terminal of each leg circuit 52 remains at or above the voltage of the corresponding output terminal. Furthermore, the single-phase implementations, such as the converter 110 in FIG. 1B above, may be implemented by equivalent pulse width modulation or other switching techniques, with the leg circuit switching signal sets being offset by 180 degrees relative to one another, and with appropriate modulation offsets or adjustments to provide for the output terminal of individual leg circuits 152 being at or below the voltage of the corresponding input terminal.

Referring now to FIGS. 8-17, the performance of a 7.5 KVA prototype three-phase AC-to-AC converter of the type shown in FIG. 1A was evaluated in both constant frequency (CF) and variable frequency (VF) operational modes. In these experiments, the line rms input voltage (e.g., $V_{AB}$) was 208 VAC for CF mode and 104 VAC for VF mode, the source inductance Ls was 2.5 mH, the output loading included three phase R-L loads with R=14.6 OHMS and L=2.5 mH, wherein the DC capacitor $C_{DC}$=2350 µF, using a space vector modulation PWM scheme with a sampling frequency fsw=3.24 kHz. The system was tested using input power at 60 Hz, with the input side using line voltage oriented closed-loop vector control system to control input current, and the output side using open loop voltage control. In the tested constant frequency (CF) operation, the input and output voltage waveforms were controlled so as to remain nearly in phase, with the DC circuit voltage Vd maintained at 360 VDC using input and output modulation index values of 0.8.

Figure 8:
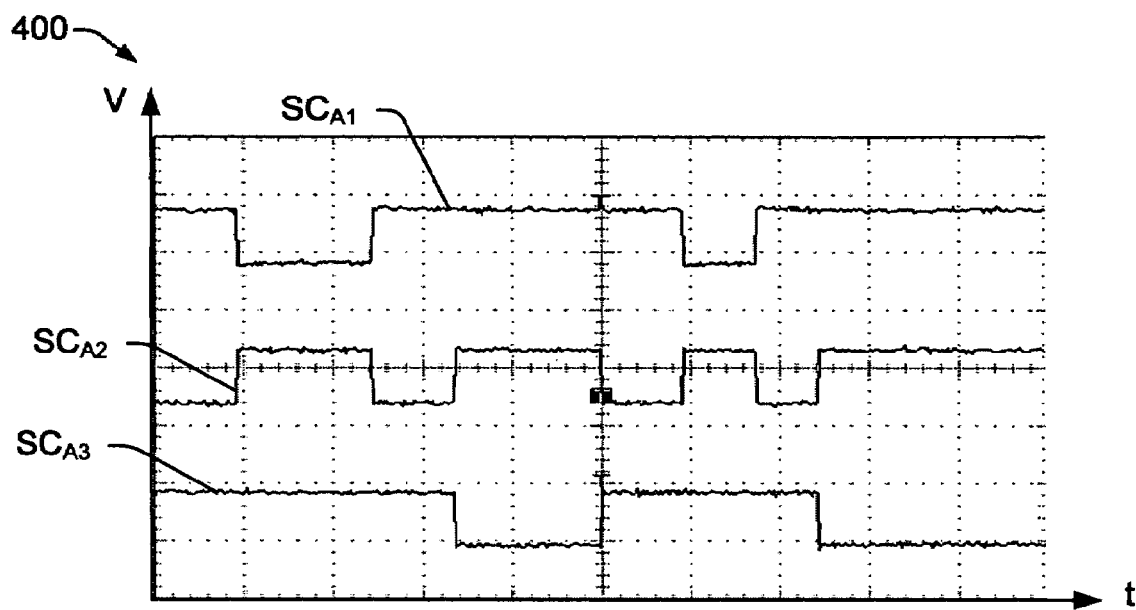
FIG. 8 is a graph showing an exemplary set of leg circuit switching gate driver signals in an experimental constant frequency implementation of the three-phase AC-to-AC converter of FIG. 1A.
Figure 9:
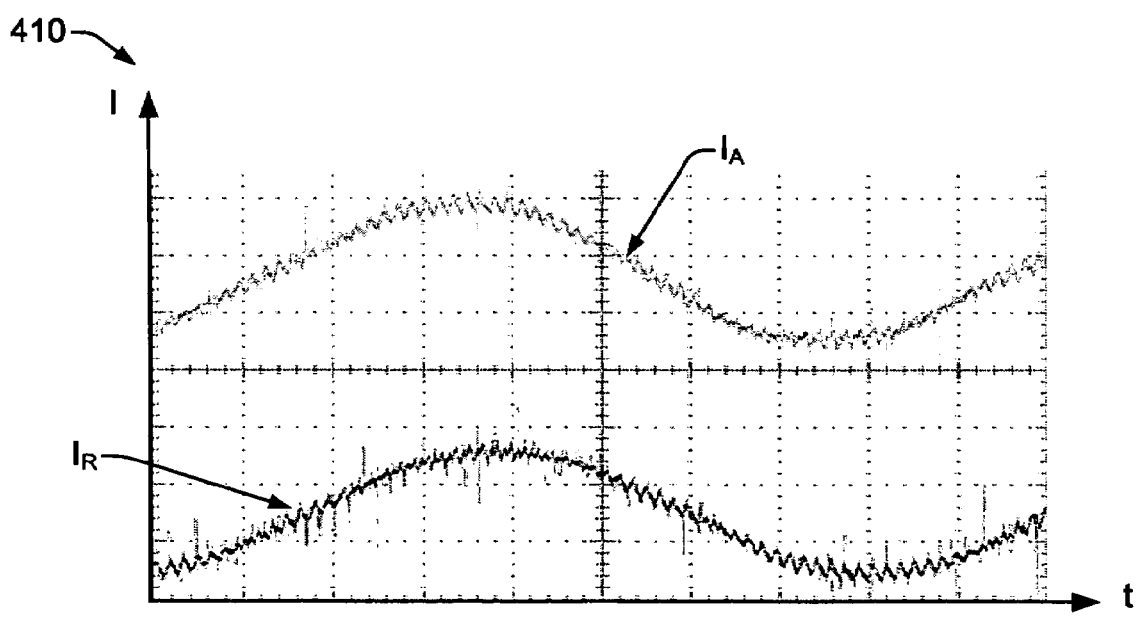
FIG. 9 is a graph illustrating exemplary input and output current waveforms in the experimental constant frequency implementation of the converter of FIG. 1A.
Figure 10A:
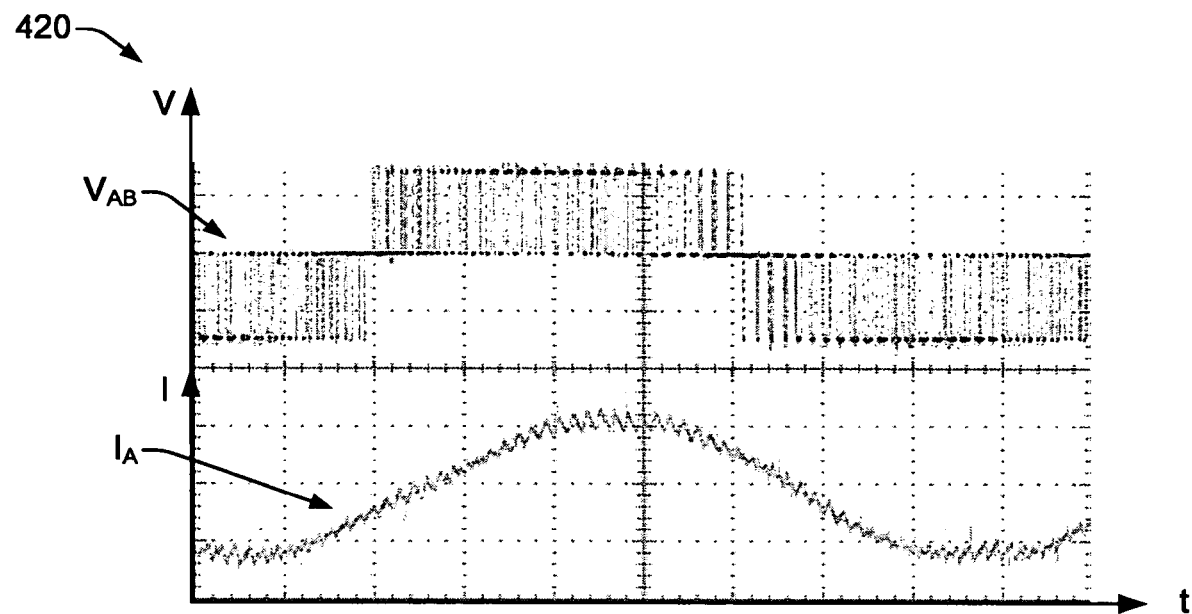
FIGS. 10A and 10B are graphs showing exemplary input and output line voltage and phase current plots, respectively, in the experimental constant frequency implementation of the converter of FIG. 1A.
Figure 10B:
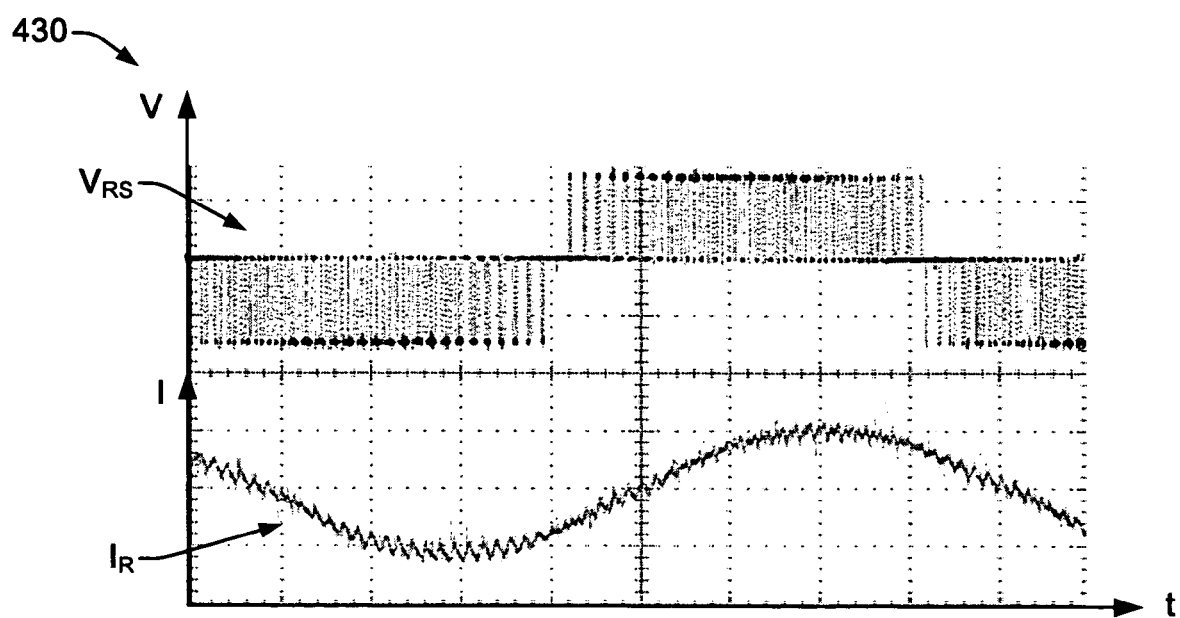
Figure 11A:
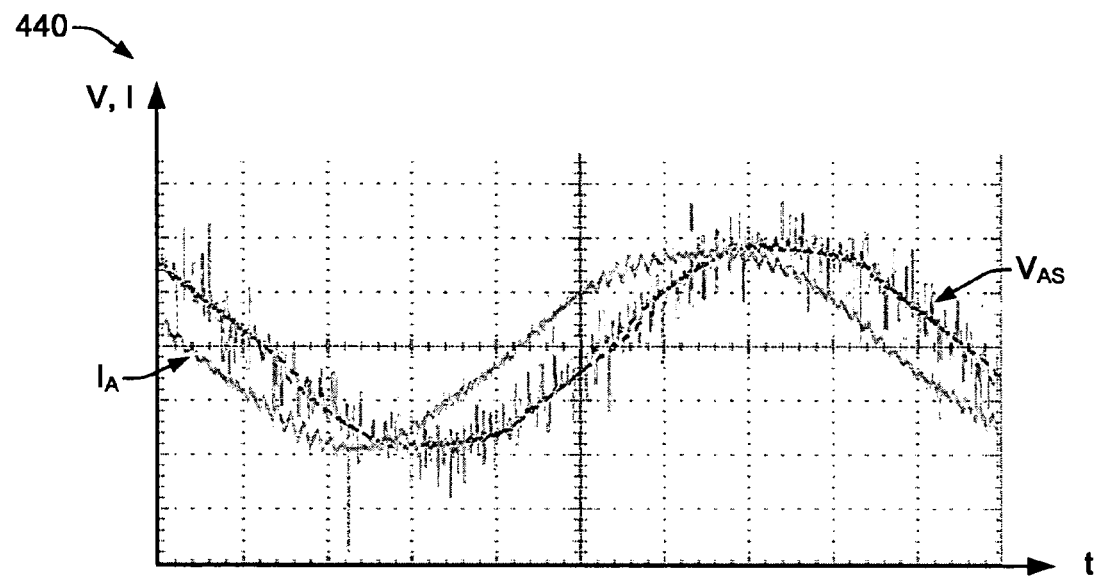
FIGS. 11A-11C are graphs illustrating exemplary input line voltage and phase current curves for leading, unity, and lagging power factor operation, respectively, in the experimental constant frequency implementation of the converter of FIG. 1A.
Figure 11B:
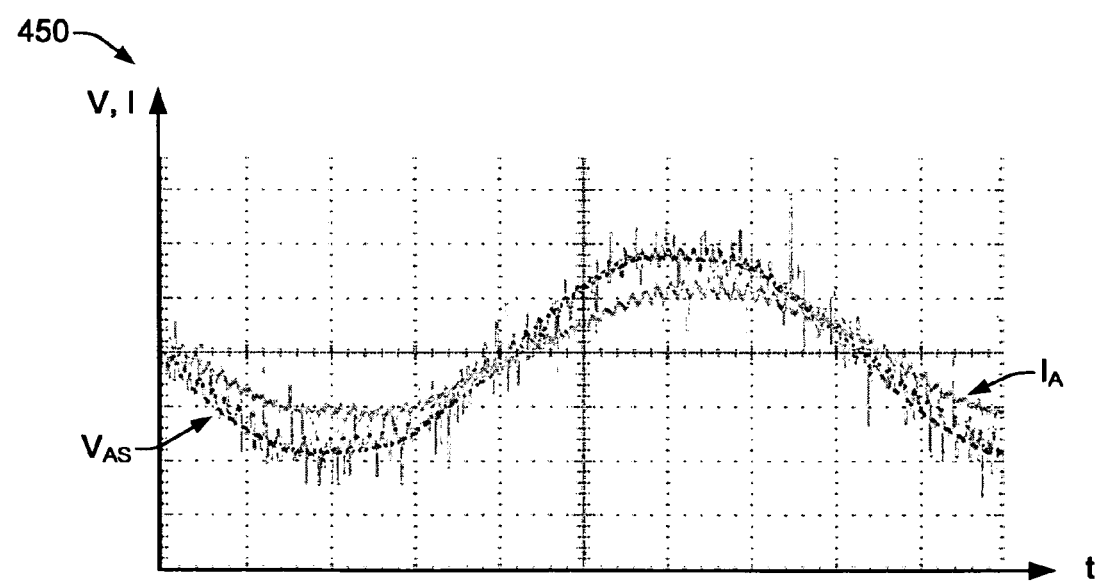
Figure 11C:
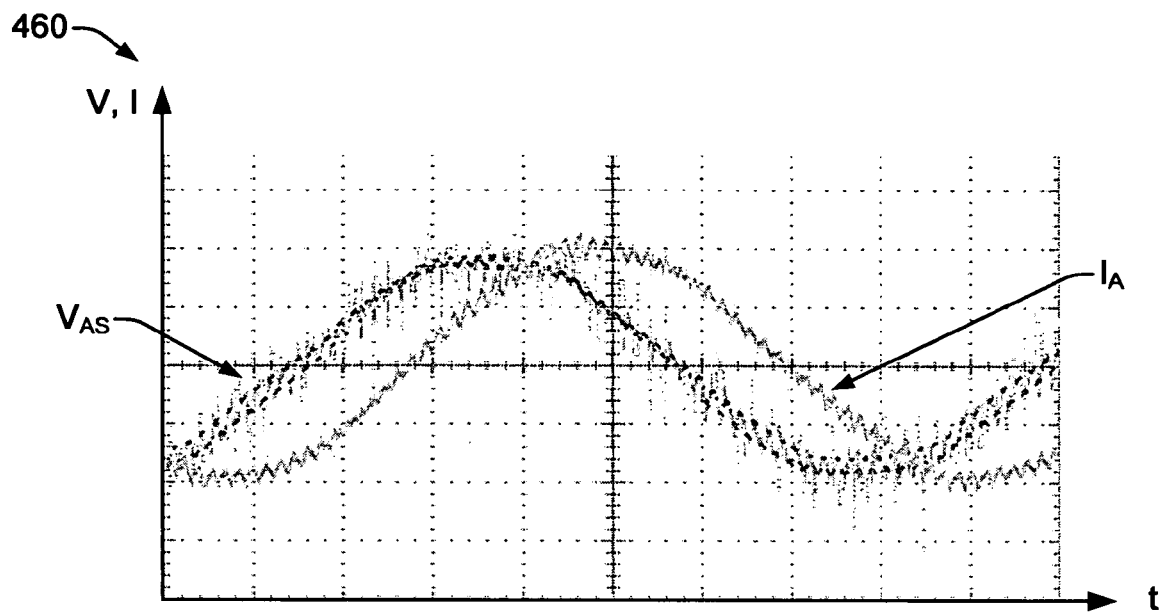
Figure 12:
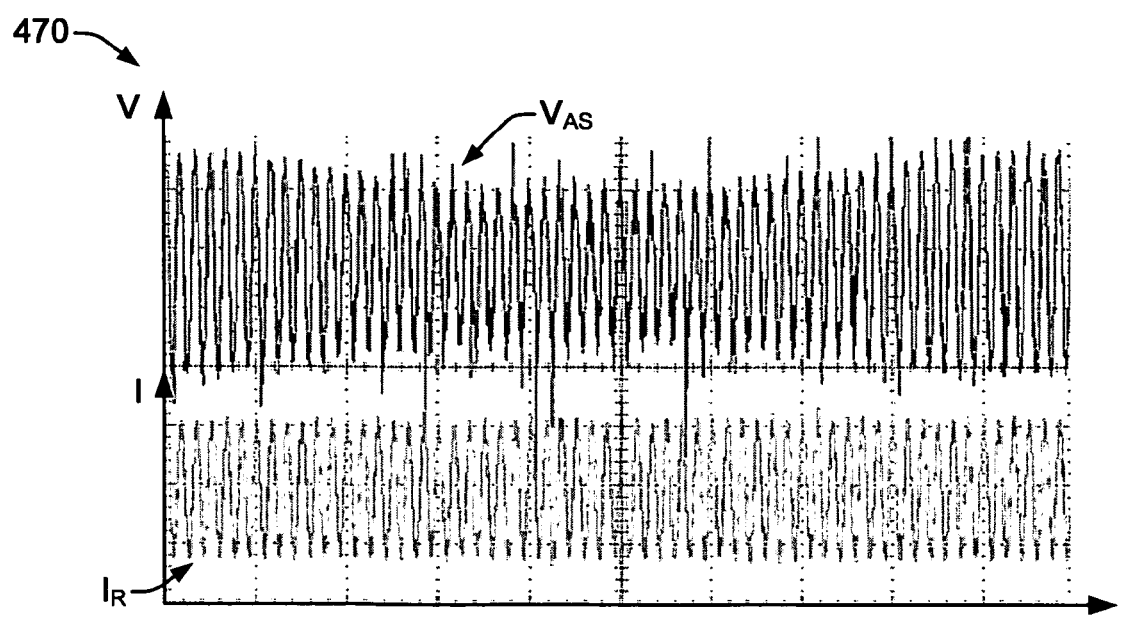
FIG. 12 is a graph showing exemplary input line voltage and output phase current curves to illustrate output voltage restore operation when input voltage drops in the experimental constant frequency implementation of the converter of FIG. 1A.

With respect to constant frequency operation, FIG. 8 provides a graph 400 showing an exemplary set of leg circuit switching gate driver signals $SC_{A1}$, $SC_{A2}$, and $SC_{A3}$ in the experimental implementation of the converter 10. FIG. 9 includes a graph 410 illustrating exemplary input and output current waveforms $I_A$ and $I_R$, respectively, in the CF experimental converter 10, showing nearly sinusoidal input and output current performance with a slight lagging output power factor. FIGS. 10A and 10B present graphs 420 and 430, respectively, showing experimental input and output line voltage ($V_{AB}$ and $V_{RS}$) and phase current plots ($I_A$ and $I_R$), respectively, in constant frequency operation with the input and output line voltage waveforms sharing the same dc circuit voltage Vd. FIGS. 11A-11C are graphs 440, 450, and 460 showing input line voltage and phase current curves ($V_{AS}$ and $I_A$) for leading, unity, and lagging power factor operation, respectively, in the experimental constant frequency implementation. The graphs in FIGS. 11A-11C illustrate the adjustable power factor ability of the exemplary experimental converter 10, with the input power factor having effectively no adverse impact on the ability to control the output power factor, indicating the adaptability of the inventive converter system 10 to compensate for low load power factor applications. FIG. 12 provides a graph 470 with input line voltage and output phase current curves $V_{AS}$ and $I_R$, respectively, illustrating the regulation capability of the system 10 with respect to maintaining the output current $I_R$ in the presence of input voltage drops (voltage restore ability).

For variable output frequency (VF) mode, the experimental AC-to-AC converter performance is exemplified in FIGS. 13A-17, with the DC circuit voltage Vd maintained at 360 VDC using input and output modulation index values of 0.4.

Figure 13A:
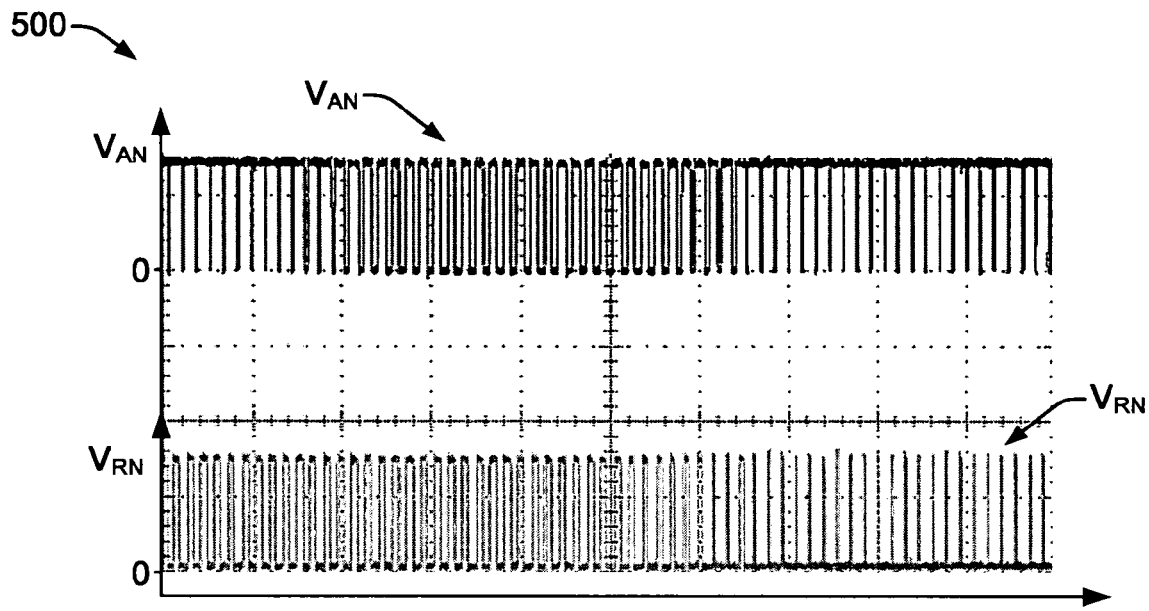
FIG. 13A is a graph illustrating exemplary input and output phase voltage curves in an experimental variable frequency (VF) implementation of the converter of FIG. 1A.
Figure 13B:
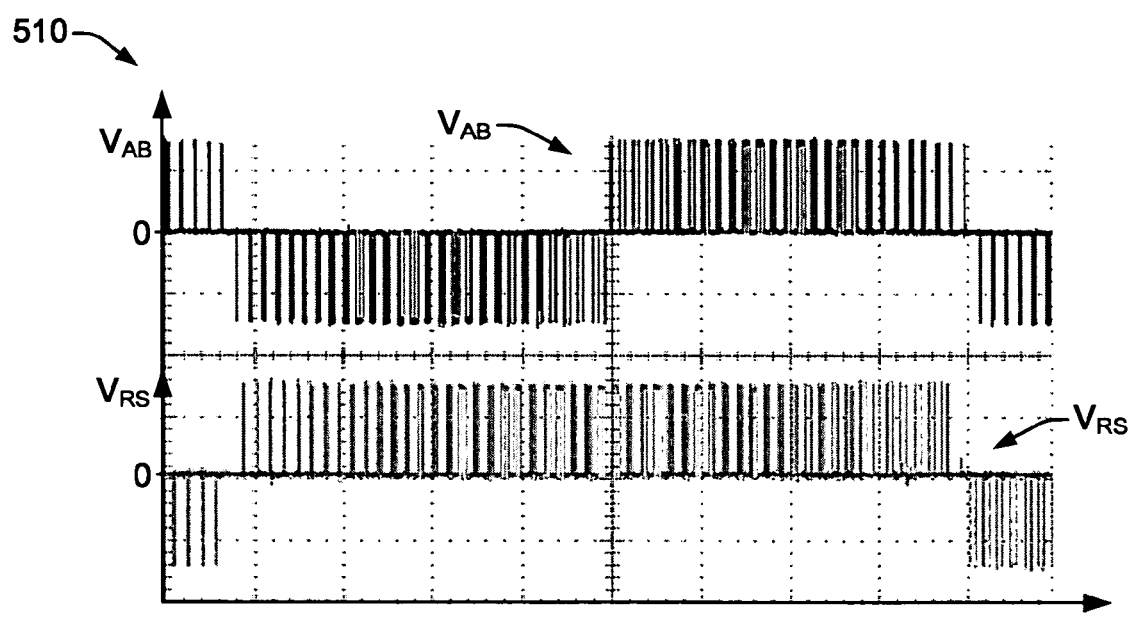
FIG. 13B is a graph illustrating exemplary input and output line voltage curves in the experimental variable frequency implementation of the converter of FIG. 1A.
Figure 14A:
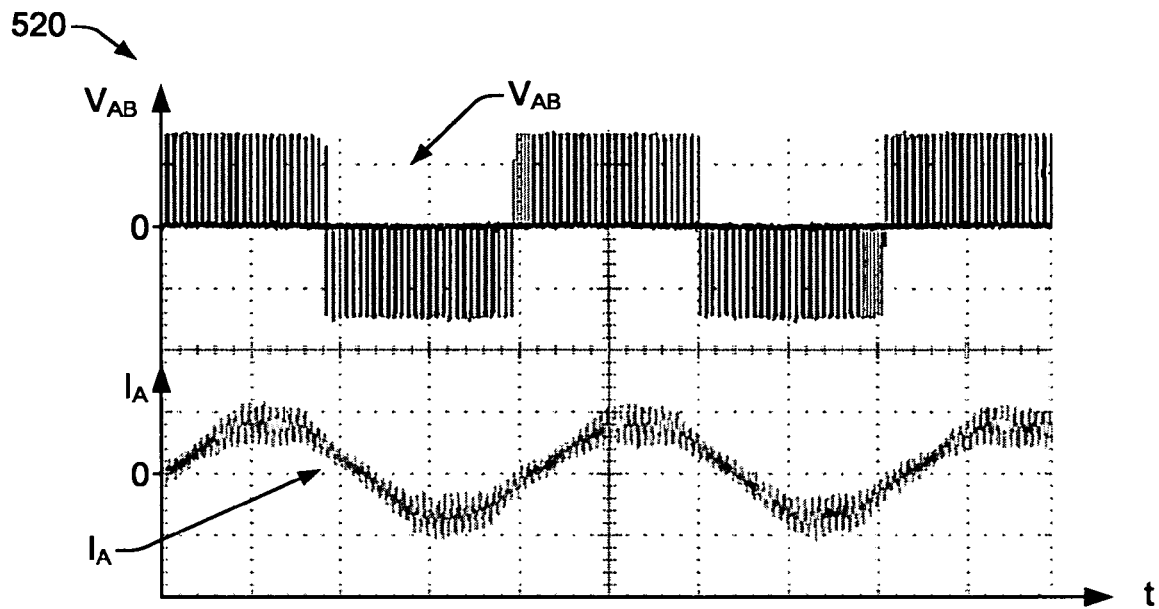
FIG. 14A is a graph showing exemplary input line voltage and input current curves in the experimental variable frequency implementation of the converter of FIG. 1A.
Figure 14B:
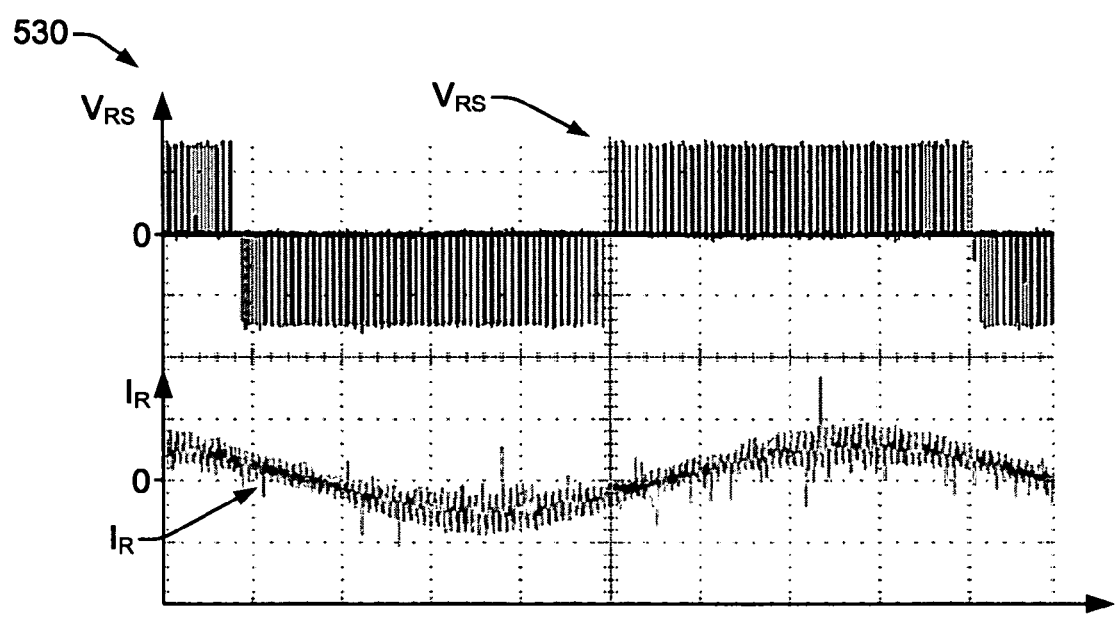
FIG. 14B is a graph illustrating exemplary output line voltage and output current curves in the experimental variable frequency implementation of the converter of FIG. 1A.
Figure 15:
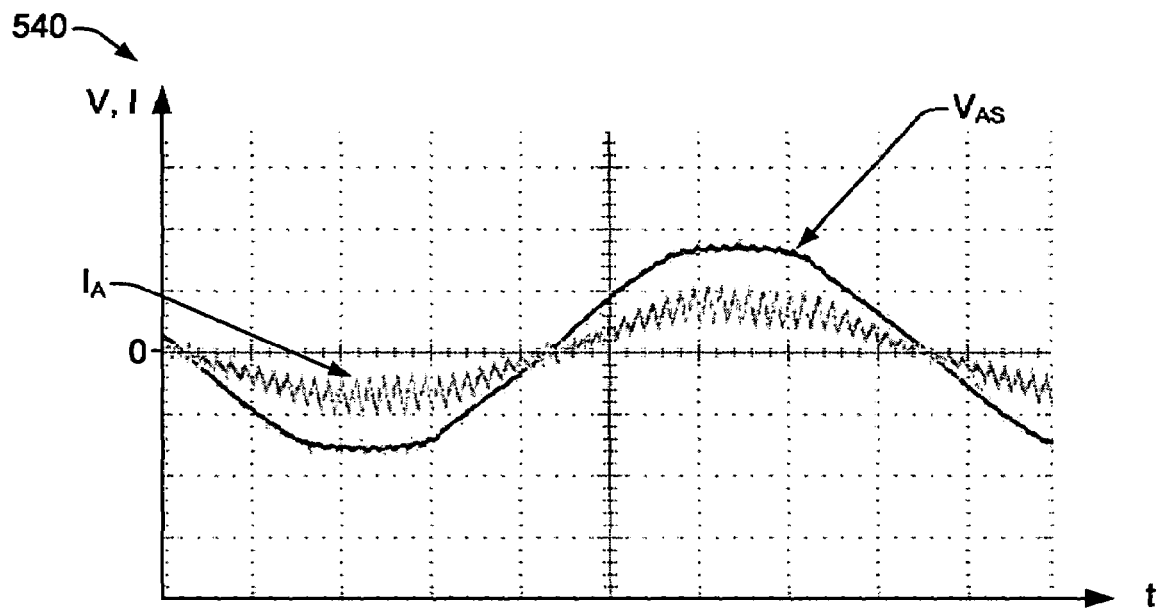
FIG. 15 is a graph showing exemplary input phase voltage and phase current curves in the experimental variable frequency implementation of the converter of FIG. 1A.
Figure 16:
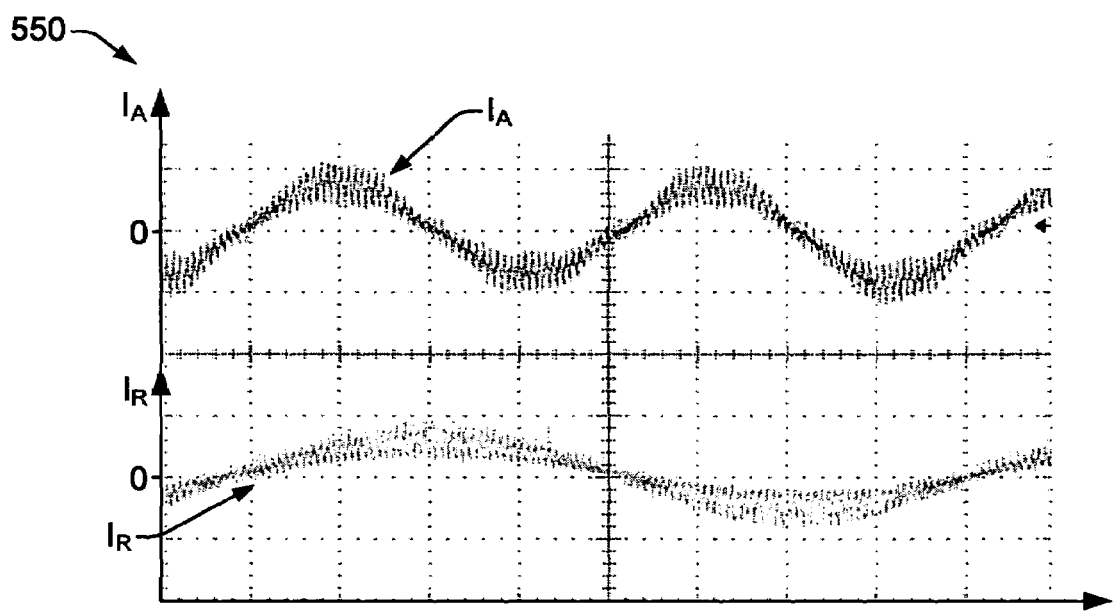
FIG. 16 is a graph illustrating exemplary input and output phase current curves in the experimental variable frequency implementation of the converter of FIG. 1A.
Figure 17:
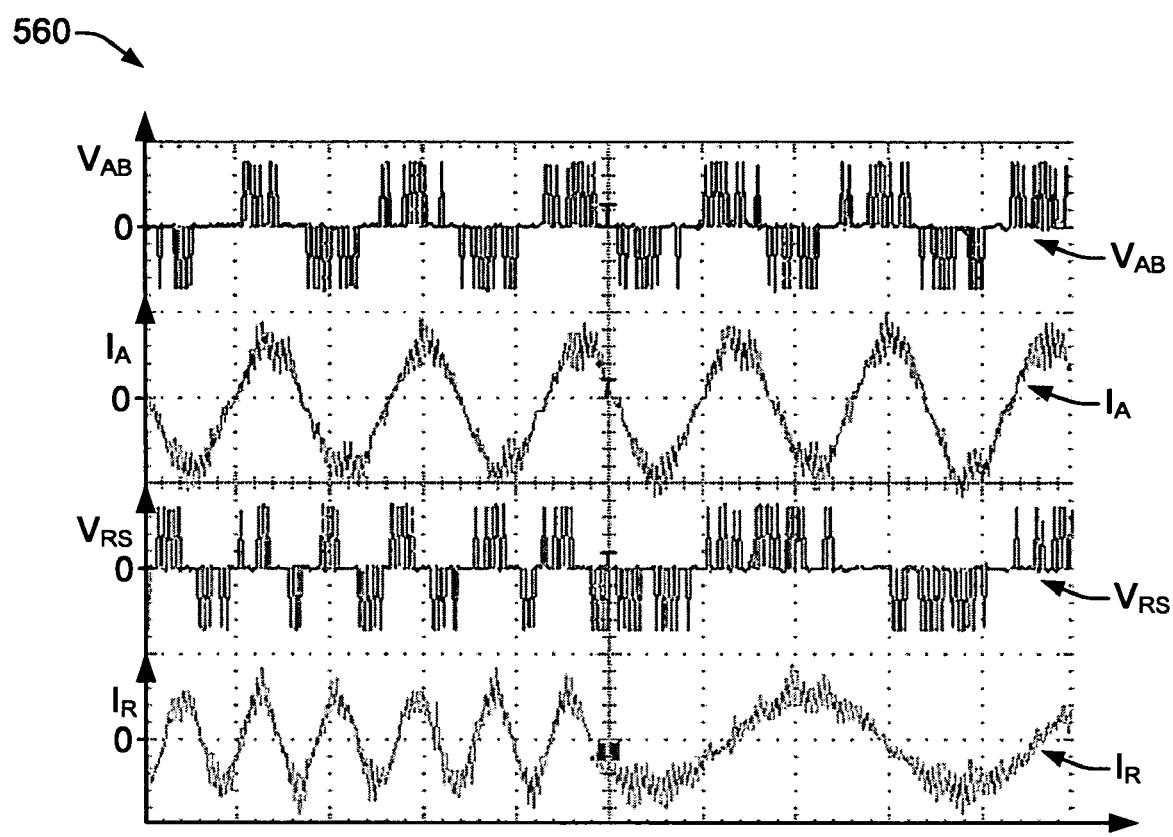
FIG. 17 is a graph showing exemplary input and output line voltage and phase current curves during a change in output frequency in the experimental variable frequency implementation of the converter of FIG. 1A.

FIG. 13A includes a graph 500 illustrating input and output phase voltage curves $V_{AN}$ and $V_{RN}$, respectively for an input frequency of 60 Hz and the output frequency of 30 Hz, while the graph 510 in FIG. 13B shows input and output line voltage curves ($V_{AB}$ and $V_{RS}$), where the input frequency is held at 60 Hz and the output frequency is 30 Hz. As shown best in FIG. 13A, the output voltage $V_{RN}$ is always less than or equal to the input voltage $V_{AN}$ even though the amplitude and frequency of the output are variable. FIGS. 14A and 14B show input and output line voltage and current curves $V_{AB}$, $I_A$, $V_{RS}$, and $I_R$, respectively, where the output frequency is again 30 Hz. A graph 540 in FIG. 15 illustrates input AC source phase voltage and phase current curves $V_{AS}$ and $I_A$, and FIG. 16 provides a graph 550 showing input and output phase currents $I_A$ and $I_R$ at different frequencies in the converter 10. FIG. 17 is a graph 560 showing exemplary input and output line voltages $V_{AB}$ and $V_{RS}$, respectively, as well as input and output phase currents $I_A$ and $I_R$ in the three-phase conversion system 10 during a change in output frequency from 120 Hz to 30 Hz, wherein the input current and voltage waveforms $I_A$ and $V_{AB}$ are essentially undisturbed during the frequency adjustment dynamics. The invention may thus find use in a variety of applications requiring conversion of input AC power to output AC power at variable amplitude and frequency, without requiring the cost, space, and complexity of back-to-back or matrix converters, wherein one nine devices are needed to convert three-phase AC power.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. An AC-to-AC conversion system, comprising:
    a three-phase AC input connection having first, second, and third AC input terminals for receiving three-phase AC electrical input power;
    a three-phase AC output connection having first, second, and third AC output terminals for providing three-phase AC electrical output power;
    a DC circuit comprising first and second DC terminals and an energy storage component;
    a switching network including a total of nine switching devices forming three leg circuits with a total of three switching devices in each leg circuit, each leg circuit connected to a corresponding AC input terminal and to a corresponding AC output terminal, each leg circuit comprising a first switching device coupled between the corresponding AC input terminal and the first DC terminal, a second switch coupled between the corresponding AC input terminal and the corresponding AC output terminal, and a third switch coupled between the corresponding AC output terminal and the second DC terminal; and a control system coupled with the switching network and providing switching control signals to the switching devices to convert input AC electrical power from the input connection to output AC electrical power at the output connection.

2. The conversion system of claim 1, wherein the control system provides three sets of switching control signals to the switching network, each set being provided to a corresponding one of the leg circuits, the control system providing each set of switching control signals in one of three states including a first state to couple the corresponding input and output terminals to the first DC terminal, a second state to couple the input and output terminals to the second DC terminal, and a third state to couple the input terminal to the first DC terminal and to couple the output terminal to the second DC terminal.

3. The conversion system of claim 2, wherein each set of switching control signals includes first, second, and third switching control signals respectively coupled to the first, second, and third switching devices of the corresponding leg circuit, with the first and second switching devices turned on and the third switching device turned off in the first state, the first switching device turned off and the second and third switching devices turned on in the second state, and with first and third switching devices turned on and the second switching device turned off in the third state.

4. The conversion system of claim 1, wherein the control system provides three sets of switching control signals to the switching network, each set being provided to a corresponding one of the leg circuits, wherein each set of switching control signals includes first, second, and third switching control signals respectively coupled to the first, second, and third switching devices of the corresponding leg circuit, with the first and second switching devices turned on and the third switching device turned off in a first state, the first switching device turned off and the second and third switching devices turned on in a second state, and with first and third switching devices turned on and the second switching device turned off in a third state.

5. The conversion system of claim 1, wherein the switching control signals are provided by the control system to maintain the output terminal connected to each leg circuit at the same or a lower voltage than the input terminal connected to the same leg circuit.

6. The conversion system of claim 1, wherein the switching control signals are pulse width modulated by the control system using sinusoidal pulse width modulation or space vector modulation.

7. The conversion system of claim 1, wherein the control system provides the switching control signals to convert input AC electrical power from the input connection to variable frequency output AC electrical power at the output connection.

8. The conversion system of claim 1, wherein the switching devices can block voltage in only one direction and allow current flow in two directions.

9. An AC-to-AC conversion system, comprising:
a three-phase AC input connection having first, second, and third AC input terminals for receiving three-phase AC electrical input power;
a three-phase AC output connection having first, second, and third AC output terminals for providing three-phase AC electrical output power;
a DC circuit comprising first and second DC terminals and an energy storage component;
a switching network including a total of nine switching devices, said switching devices being able to block voltage in only one direction and allow current flow in two directions, said switching network being coupled with said AC input and output connections and with said DC circuit; and
a control system coupled with the switching network and controlling the switching devices to convert input AC electrical power from the input connection to output AC electrical power at the output connection.

10. The conversion system of claim 9, wherein the switching network comprises three leg circuits with a total of three switching devices in each leg circuit, each leg circuit connected to a corresponding AC input terminal and to a corresponding AC output terminal, and wherein the control system provides three sets of switching control signals to the switching network, each set being provided to a corresponding one of the leg circuits, the control system providing each set of switching control signals in one of three states including a first state to couple the corresponding input and output terminals to the first DC terminal, a second state to couple the input and output terminals to the second DC terminal, and a third state to couple the input terminal to the first DC terminal and to couple the output terminal to the second DC terminal.

11. The conversion system of claim 10, wherein the control system controls the switching devices to maintain the output terminal connected to each leg circuit at the same or a lower voltage than the input terminal connected to the same leg circuit.

12. The conversion system of claim 9, wherein the control system provides pulse width modulated switching control signals to the switching network to control the switching devices using sinusoidal pulse width modulation or space vector modulation.

13. The conversion system of claim 9, wherein the control system provides the switching control signals to convert input AC electrical power from the input connection to variable frequency output AC electrical power at the output connection.

14. An AC-to-AC conversion system, comprising:
a single-phase AC input connection having first and second AC input terminals for receiving single-phase AC electrical input power;
a single-phase AC output connection having first and second AC output terminals for providing single-phase AC electrical output power;
a DC circuit comprising first and second DC terminals and an energy storage component;
a switching network including a total of six switching devices forming two leg circuits with a total of three switching devices in each leg circuit, each leg circuit connected to a corresponding AC input terminal and to a corresponding AC output terminal, each leg circuit comprising a first switching device coupled between the corresponding AC input terminal and the first DC terminal, a second switch coupled between the corresponding AC input terminal and the corresponding AC output terminal, and a third switch coupled between the corresponding AC output terminal and the second DC terminal; and a control system coupled with the switching network and providing switching control signals to the switching devices to convert input AC electrical power from the input connection to output AC electrical power at the output connection.

15. The conversion system of claim 14, wherein the control system provides two sets of switching control signals to the switching network, each set being provided to a corresponding one of the leg circuits, the control system providing each set of switching control signals in one of three states including a first state to couple the corresponding input and output terminals to the first DC terminal, a second state to couple the input and output terminals to the second DC terminal, and a third state to couple the input terminal to the first DC terminal and to couple the output terminal to the second DC terminal.

16. The conversion system of claim 14, wherein the switching control signals are pulse width modulated by the control system using sinusoidal pulse width modulation.

17. The conversion system of claim 14, wherein the control system provides the switching control signals to convert input AC electrical power from the input connection to variable frequency output AC electrical power at the output connection.

18. The conversion system of claim 14, wherein the switching devices can block voltage in only one direction and allow current flow in two directions.

19. An AC-to-AC conversion system, comprising:
a single-phase AC input connection having first and second AC input terminals for receiving single-phase AC electrical input power;
a single-phase AC output connection having first and second AC output terminals for providing single-phase AC electrical output power;
a DC circuit comprising first and second DC terminals and an energy storage component;
a switching network including a total of six switching devices, said switching devices being able to block voltage in only one direction and allow current flow in two directions, said switching network being coupled with said AC input and output connections and with said DC circuit; and
a control system coupled with the switching network and controlling the switching devices to convert input AC electrical power from the input connection to output AC electrical power at the output connection.

20. The conversion system of claim 19, wherein the switching network comprises two leg circuits with a total of three switching devices in each leg circuit, each leg circuit connected to a corresponding AC input terminal and to a corresponding AC output terminal, and wherein the control system provides two sets of switching control signals to the switching network, each set being provided to a corresponding one of the leg circuits, the control system providing each set of switching control signals in one of three states including a first state to couple the corresponding input and output terminals to the first DC terminal, a second state to couple the input and output terminals to the second DC terminal, and a third state to couple the input terminal to the first DC terminal and to couple the output terminal to the second DC terminal.

21. The conversion system of claim 19, wherein the switching control signals are pulse width modulated by the control system using sinusoidal pulse width modulation.

22. The conversion system of claim 19, wherein the control system provides the switching control signals to convert input AC electrical power from the input connection to variable frequency output AC electrical power at the output connection.

* * * * *